Jan. 6, 1959                     C. VAN DER LELY ET AL                    2,867,071
                                      RAKING DEVICE
Filed Nov. 5, 1956                                                    2 Sheets-Sheet 1
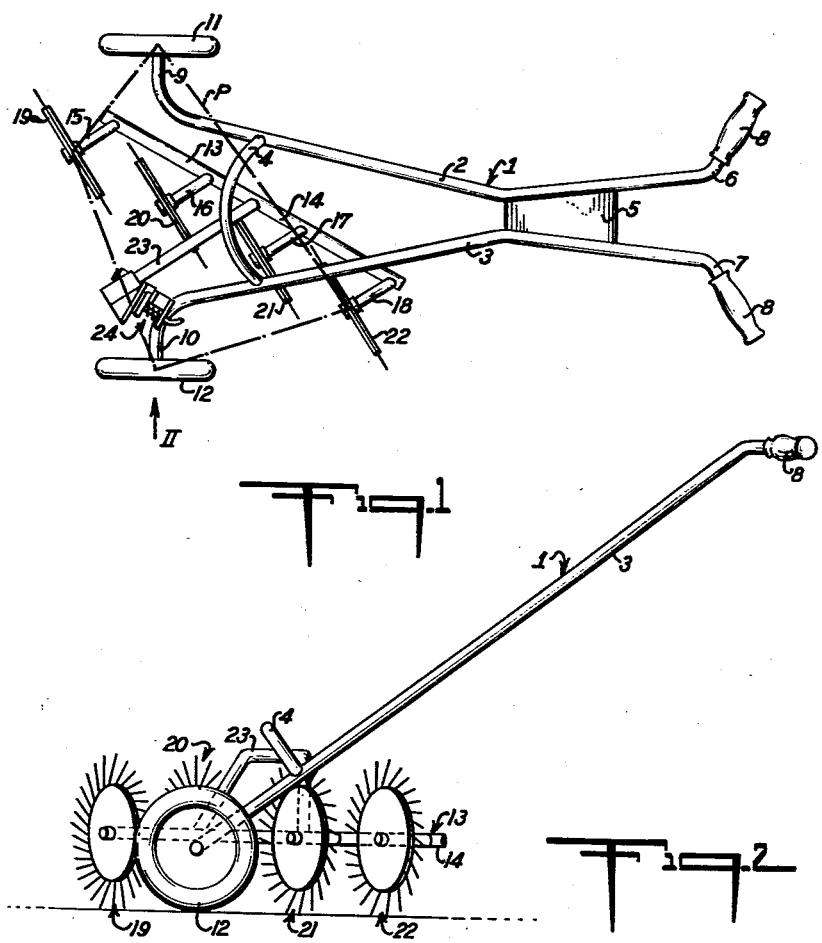
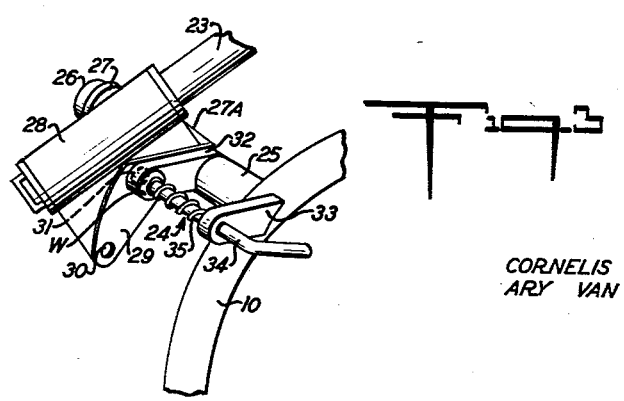
INVENTORS
CORNELIS VAN DER LELY
ARY VAN DER LELY

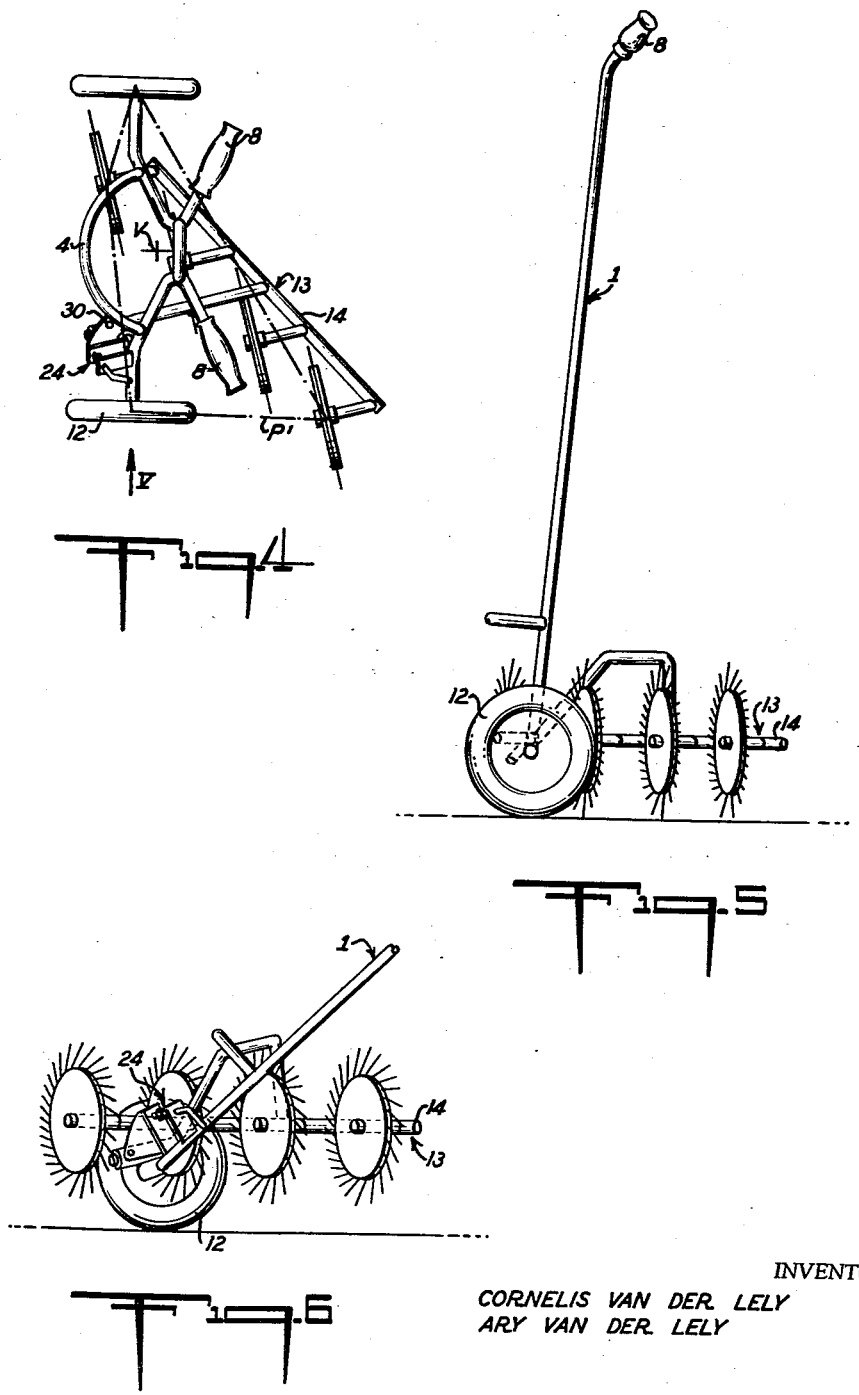

United States Patent Office 2,867,071
Patented Jan. 6, 1959

2,867,071

RAKING DEVICE

Cornelis van der Lely and Ary van der Lely, Maasland, Netherlands, assignors to C. van der Lely N. V.

Application November 5, 1956, Serial No. 620,382

Claims priority, application Netherlands November 10, 1955

7 Claims. (Cl. 56—377)

This invention relates to devices for laterally displacing material lying on the ground and of the type comprising one or more raking members, such as raking wheels, obliquely arranged with regard to the intended direction of travel of the device, and one or more running wheels.

It is an object of the invention to provide an improved small, manually-operable rake.

The disadvantage of known devices of the type with which the invention is concerned is that difficulties are encountered in storage and in setting the same in temporary inoperative position. Generally, these devices have only one or two running wheels, so that the running wheel themselves do not permit the device to rest in a position of equilibrium. Also, where such a device has a greater number of running wheels, a vertical line through the center of gravity of the device in the working position thereof generally lies outside an area that is enclosed by lines connecting the points where the running wheels are in contact with the ground.

According to the invention, there is provided a device for laterally displacing material lying on the ground with a frame, and one or more raking wheels adapted to be rotated by coming into contact with the ground or the material lying thereon. The axis of or each raking wheel is disposed so as to lie oblique to the intended direction of travel of the device, and the frame has a handle upon which the force required to move the device can be exerted. The handle is so arranged that, when the device is in operation, the handle extends away from the frame so as to lie at a location convenient for applying said force thereupon. There are one or more running wheels for the device, and the device has a total of at least three running and raking wheels. The arrangement of the handle, the frame and the running and raking wheels is such that the device can be brought to an equilibrium or rest position, where the raking wheels and each running wheel contacts the ground, and where a vertical line through the center of gravity of the device lies within the area enclosed by lines connecting the points where the said wheels contact the ground. With this device, movement of the handle brings the vertical line through the center of gravity to a position where the device can stand in equilibrium on its running wheels and raking wheels, and where the device occupies very little ground space.

In order that the raking wheels can adapt themselves to irregularities in the ground, the frame is formed in two parts which are pivotally connected together, one part of the frame having a handle for moving the device, and the other part carrying the raking wheels, means being provided for locking the two parts together when the device is in the rest position.

The device is provided with two or more running wheels, and the part of the frame having the handle and the running wheels is connected to the part of the frame carrying the raking wheels by means of two axles which are arranged at an angle to each other, the locking means being adapted to prevent relative movement of the two parts of the frame about the axles.

In order to be able to transport the device easily, the locking means is arranged to lock the two parts of the frame together in another position, in which the raking wheels are lifted free from the ground when the handle has its normal working height above the ground.

In order that an upward movement of the handle is sufficient to bring the device into the rest position from its normal working position, the locking means consist of a pin, which under the action of a spring can enter an aperture formed in a plate so as to lock the two parts of the frame together, the pin resting under the action of the spring against a guideway leading to the above-mentioned aperture.

For a better understanding of the invention, and to show how the same may be carried into effect, reference will now be made to the accompanying drawings in which:

Figure 1 is a plan view of a device for laterally displacing material lying on the ground, the device being shown in its working position, Figure 2 is a side view of the device shown in Figure 1, the view being in the direction of arrow II, Figure 3 is an enlarged fragmentary perspective view of a portion of the device shown in Figures 1 and 2, Figure 4 is a plan view of the device shown in Figures 1 to 3, the device being shown in its rest position, Figure 5 is a side view of the device when in the position shown in Figure 4, the view being in the direction of arrow V, and Figure 6 is a side view of the device when in a position in which it can be transported.

Referring now to the drawings, there is shown a device for laterally displacing material lying on the ground, the device having a first frame 1 formed from tubular frame members 2 and 3, which are connected to each other by a bow 4 and a plate 5. The bent upper ends 6 and 7 of the tubes 2 and 3 constitute a handle or a manual propelling means which is provided with hand-grips 8 for holding and manipulating the device, and the bent lower ends 9 and 10 of the tubes 2 and 3 constitute axles for running wheels 11 and 12. The frame 1 is connected to a second or auxiliary frame 13, consisting essentially of a bar 14, to which are secured axles 15, 16, 17 and 18 each of which carries a respective raking wheel 19, 20, 21 or 22. Running wheels 11 and 12 and raking wheels 19 and 22, where they contact the ground, define a polygon P. The bar 14 is connected to the tube 3 of the frame 1 by means of a bow 23 and a hinge means or coupling or connection 24. As shown in Figure 3, the connection 24 comprises a first axle 25, around which a bushing or bearing 27 is rotatably mounted, the bushing 27 being secured in place by a ring 26. A second bushing or bearing 28 is connected to the bushing 27 and the bow 23 (the end of which constitutes a second axle) of the frame 13 is rotatably mounted in the bushing 28. A sector-shaped plate 29 is mounted on one side of the bushing 28 and is disposed perpendicular to the end 27A of the bushing 27, the plate 29 being mounted so as to be rotatable together with the bushing 27 about the axle 25. Two holes 30 and 31 are formed in the sector-shaped plate 29, and are spaced at equal distances from the axle 25.

Two arms 32 and 33 are mounted respectively on the axle 25 and the lower end 10 of the tube 3, the arms 32 and 33, at their free ends, being formed with apertures, through which a pin or locking means 34 passes. A spring or resilient means 35 mounted around the pin 34 operates against a washer W on the pin and presses the pin towards and against the sector-shaped plate 29.

If the arms 32 and 33 of the frame and the axle 25 turn about the axis of the bushing 27, the pin 34, which, under the action of the spring 35 continuously presses against the sector-shaped plate 29, slides along the plate 29. If, however, the pin 34 is located so as to lie in front of the aperture 30 or 31 of the sector-shaped plate 29, the pin 34 is pressed into the aperture and prevents further pivotal movement of the frame 1 with regard to the sector-shaped plate 29, thus locking the two parts 1 and 13 of the frame together. By removing the pin 34 from the aperture 30 or 31 against the action of the spring 35, movement of the frame 1 with regard to the plate 29 is again possible.

In the working position of the device, which is shown in Figures 1 and 2, the frame 1 can move pivotally with regard to the plate 29, since the pin 34 is arranged to press against that part of the sector-shaped plate 29, which lies between the apertures 30 and 31, and which forms a guideway for the pin. In the working position, in which the device is moved by an operator pushing the device and holding the hand-grips 8, the pin 34 will not be pressed into one of the apertures 30 and 31, if the height of the handle is only varied between certain limits.

However, when the handle constituting a control means is raised as far as it will go, the pin 34 is pressed into the aperture 30 and the frame 1 becomes locked in the rest position. When the device is in the rest position, a vertical line V through the center of gravity of the device lies within the area or polygon P' enclosed by lines connecting the outer supporting points of the device on the ground, viz. the lines connecting the points where the wheels 11 and 12 and the raking wheels 19 and 22 contact the ground. In this position the device is in equilibrium.

When the handle is lowered from its working position, the pin 34 is pressed into the aperture 31 of the sector-shaped plate 29, and when the handle is subsequently raised to its normal height, the frame 13 is lifted up from the ground and the device can be transported easily, this position being shown in Figure 6.

What we claim is:

1. A device for laterally displacing material lying on the ground comprising a frame normally in operative position, running wheels connected to said frame and manual propelling means on the frame for propelling said frame, rake wheel supporting means, hinge means connecting the rake wheel supporting means to said frame, a plurality of rake wheels rotatably supported by said supporting means, the contact of the running wheels and two of the rake wheels with the ground defining a polygon of ground contact, and means on said device for releasably retaining the frame in a second position on the hinge means with the center of gravity of the frame overlying the polygon.

2. A device for laterally displacing material lying on the ground comprising a first frame having operative and inoperative positions, running wheels on and supporting the frame for ground traversing movement, an auxiliary frame, a hinge coupling connecting said auxiliary frame to said first frame, a series of rake wheels supported on said auxiliary frame and defining outermost positions relative to the ground, said running wheels defining contacts with the ground which with said outermost positions define a polygonal area on the ground, and control means on said first frame to move said first frame into positions relative to said auxiliary frame so that in at least one position, constituting an inoperative position, the center of gravity of said first frame is positioned above the polygonal area.

3. A device as claimed in claim 2 comprising locking means including a pin and pin receptacle coupled intermediate said first frame and hinge coupling, and resilient means yieldably urging said pin into engagement with said receptacle to lock said first frame and hinge coupling in fixed relative positions.

4. A device as claimed in claim 2 comprising locking means coupled intermediate said first frame and hinge coupling for locking the same in predetermined relative positions.

5. A device as claimed in claim 2 wherein said hinge coupling comprises first and second axle members angularly disposed with respect to each other and first and second bearing members respectively rotatable on said axle members, selected of said members being coupled to said frame for enabling relative displacement therebetween.

6. A device as claimed in claim 5 wherein the members are adjustable for vertically displacing said auxiliary frame relative to said running wheels so that said rake wheels are movable to a position out of contact with the ground.

7. A device for laterally displacing material lying upon the ground comprising two spaced and coaxially aligned running wheels, an elongated frame, axle means at one end of said frame for engaging said running wheels whereby said elongated frame is pivotable relative to said axle means, an auxiliary frame, raking wheels rotatably supported on said auxiliary frame, and hinge means coupling said elongated and auxiliary frame to enable the pivotal movement of the elongated frame to a vertical storage position with said auxiliary frame remaining in substantially fixed position.

References Cited in the file of this patent

UNITED STATES PATENTS

| 2,447,354 | Morrill | Aug. 17, 1948 |
| 2,716,559 | Boyce | Aug. 30, 1955 |
| 2,735,256 | West | Feb. 21, 1956 |